July 14, 1953 — F. HANSALIK — 2,645,189
ROLL SEPARATOR
Filed Aug. 19, 1950 — 3 Sheets-Sheet 1

INVENTOR.
FREDERICK HANSALIK
BY Nicholas J. Garofalo
his ATTORNEY

July 14, 1953 F. HANSALIK 2,645,189
ROLL SEPARATOR
Filed Aug. 19, 1950 3 Sheets-Sheet 2
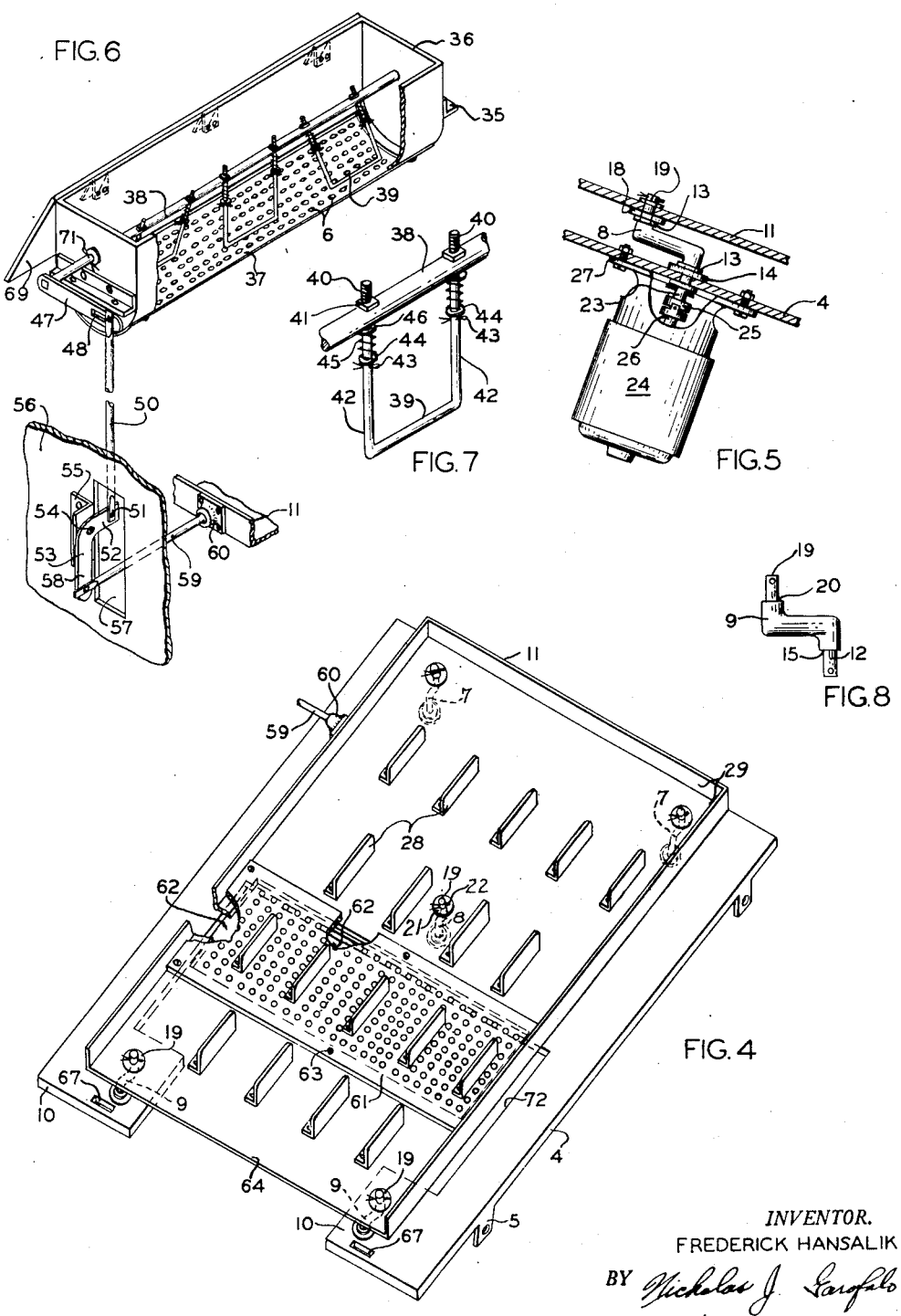
INVENTOR.
FREDERICK HANSALIK
BY Nicholas J. Garofalo
his ATTORNEY

INVENTOR.
FREDERICK HANSALIK
BY
ATTORNEY

UNITED STATES PATENT OFFICE 2,645,189

ROLL SEPARATOR

Frederick Hansalik, Island Park, N. Y.

Application August 19, 1950, Serial No. 180,365

4 Claims. (Cl. 107—7)

The present invention relates generally to dough handling machines. In particular, it concerns a type of machine novel and useful for insuring the division of dough into individual flour dusted rolls.

In the preparing of bread rolls it is customary to take a fairly large batch of dough, round it, flatten it somewhat, and then press a cutter down upon it so as to divide it into approximately a dozen rolls of substantially uniform size. The baker then dusts the divided dough with flour, picks up the several rolls and sets them aside preparatory to baking. But, it often happens, because of the sticky nature of dough, that the roll dividing knife in cutting the dough does not always bring about a complete separation of all the rolls from one another. Many times the cut is not clean through and a number of the rolls remain partly stuck together. To save the time and labor of picking the individual rolls from one another, the mass of dough is kneaded, reformed and again placed beneath the cutter. Considerable time and expense is wasted because of this repeat operation.

I have invented a machine, simple and economical in structure, which will insure that the dough, after being subjected to the cutter, will be broken up into separate individual rolls without their clinging to one another.

My machine eliminates the time and labor consuming step of reforming and recutting the dough when the separation of the rolls from one another is not complete.

In breaking up the dough into individual rolls, my machine simultaneously and automatically dusts the rolls with flour to prevent them from rejoining together after being separated. Besides insuring the separation of the rolls, my machine agitates the rolls down, through and out of the machine onto a conventional work bench or belt conveyor. In the process of doing this it salvages any excess flour used as well as small scraps of dough.

All this is accomplished by a machine having a pan that is set in a rotary motion by a motor. The pan is set in an inclined position and is provided with fixed ribs or separators. Roll dough after being subjected to the cutter is fed into the pan through an opening at the front of the machine. The pan is mounted on cranks which are caused to rotate upon the energization of a motor. A side to side rotary motion is imparted to the pan. The pan in its side to side motion, together with its ribs, causes the cut batch of dough to shake about, descend down the inclined pan, over and about the ribs, and in the process to separate into individual rolls. While this movement of the dough about the pan is going on, a flour duster above the pan automatically rains flour down upon the rolls. This prevents them from rejoining together, and thereby further insures the separation of the rolls from one another. The rolls, upon being separated and flour dusted, roll down the inclined pan and pass out through the rear of the machine onto a conventional work bench or conveyor.

Any excess flour in the pan, together with small scraps of dough, are caused to drop through a screen in the floor of the pan to a container below. The excess flour may later be recovered from the container and used again.

The general object of this invention is a machine for insuring the separation into individual rolls, dough that has been previously cut by a roll dividing knife.

A more specific object of this invention is a machine that will break up into individual rolls dough that has been previously cut, which will automatically dust the rolls with flour, and which will roll them down an incline out of the machine.

Another object of this invention is a dough handling machine that will save time, labor, and expense in the preparation of rolls for baking by insuring the separation of roll dough into individual rolls, and by automatically dusting them with flour.

A still further object of the invention is a roll separating machine that will salvage excess flour used and small scraps of dough for reuse.

These, as well as other objects and advantages of this invention, will become apparent as this specification unfolds in greater detail, and as it is read in conjunction with the accompanying drawings wherein a preferred embodiment of the invention is illustrated.

In the drawings:

Fig. 4 is a perspective view of the pan and supporting plate with some sections cut away.

Fig. 5 is a detail of the main crank.

Fig. 6 is a perspective illustration of the duster unit.

Fig. 7 is a detail of one of the duster unit agitators.

Fig. 8 is a detail of one of the cranks.

Figure 1:
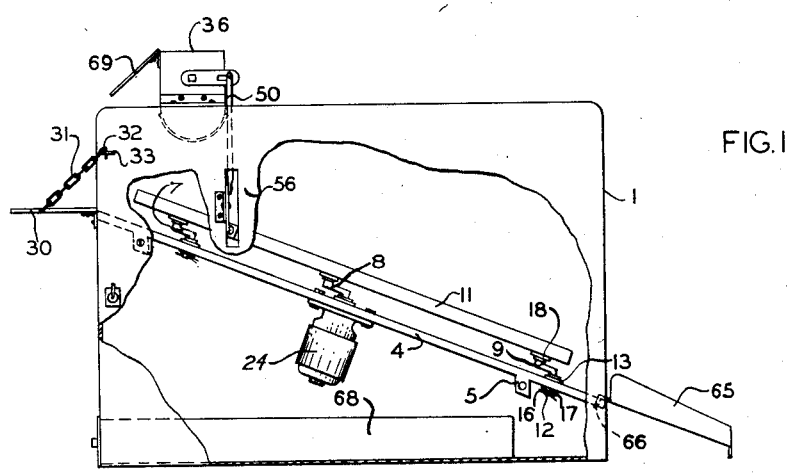
Fig. 1 is a side elevation view of the machine with sections of the housing cut away to give a view into its interior.
Figure 2:
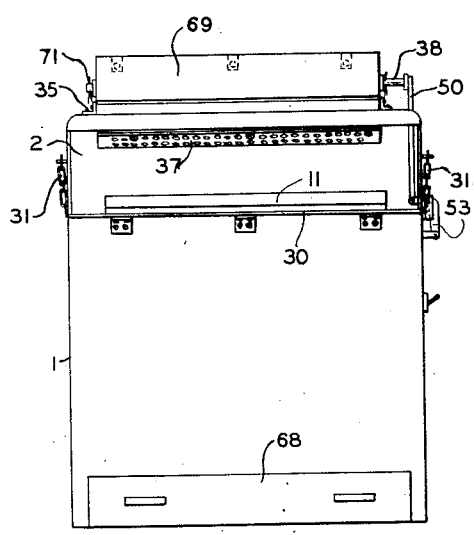
Fig. 2 is a front elevation view.
Figure 3:
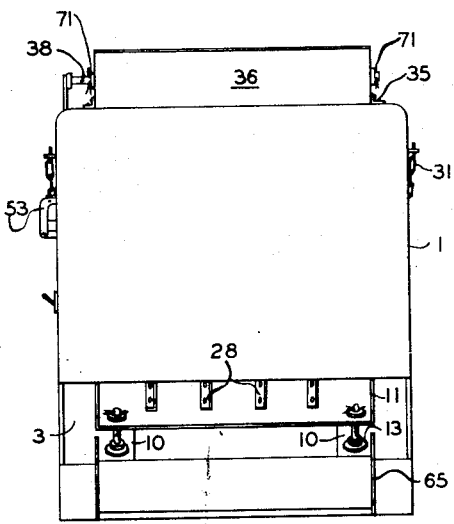
Fig. 3 is a rear elevation view.
Figure 10:
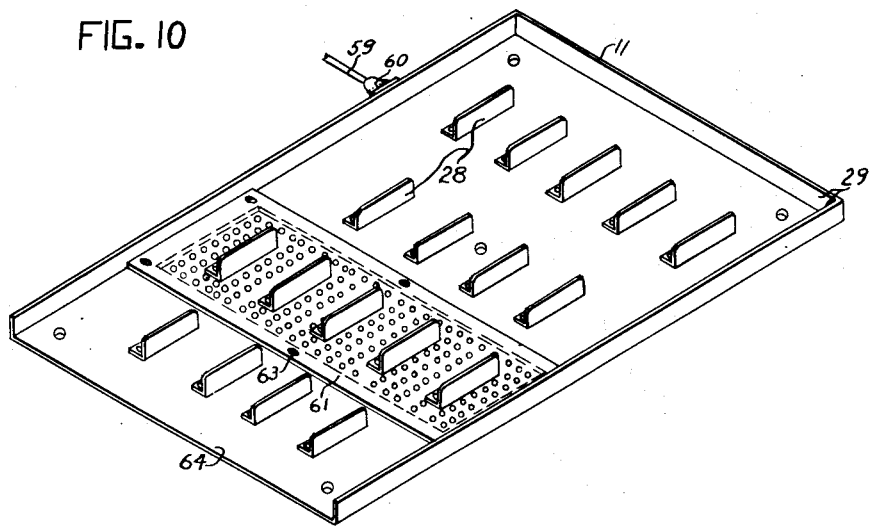
Fig. 10 is a perspective detail of the pan.
Figure 9:
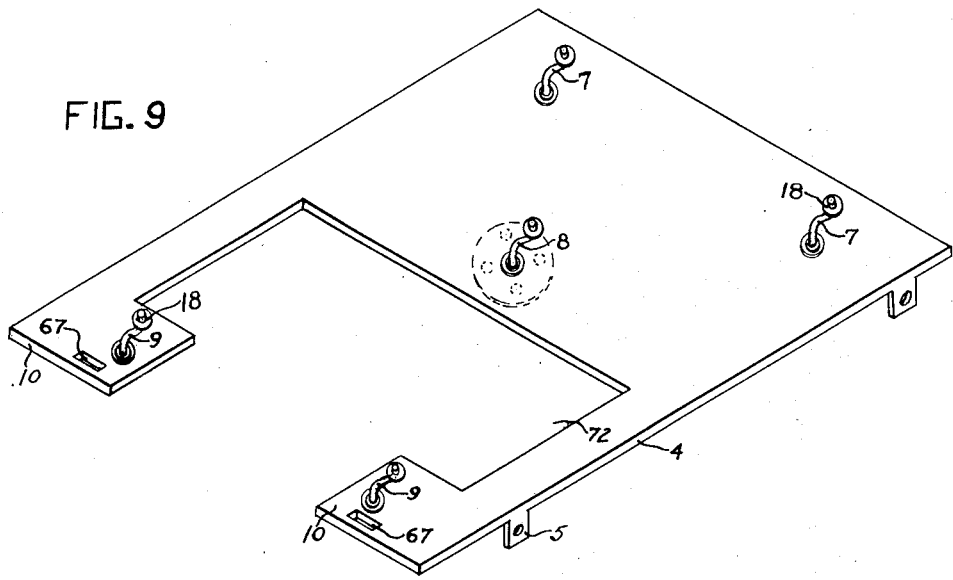
Fig. 9 is a detail of the crank plate and its associated cranks.

Referring to the drawings, there is shown a housing or cabinet 1. At the upper front of the housing is a feed opening 2. At the lower rear portion of the housing is an exit opening 3. Within the housing is a partly open U-plate section 4 which abuts all four interior walls of the housing, and which is affixed to such walls by side flanges 5. The forward end of plate 4 commences at the lower edge of the feed opening 2, while the rear or leg end of plate 4 terminates at the lower edge of the exit opening 3. Plate 4 is secured in the housing 1 in an inclined position preferably at an angle of about 25 degrees. Plate 4 serves as a support for pan cranks. There are preferably five pan cranks. There are two upper cranks 7, one in each corner of the forward part of plate 4, two lower cranks 9, one in each of the rear or leg portion 10 of plate 4, and a main crank 8. The drive crank 8 is located preferably at about the center of plate 4.

The cranks support and serve to give a side to side rotary movement to a pan 11. The lower ends 12 of the cranks extend through cup bearings 13 and through the plate 4. The cup bearings are secured to the surface of plate 4 by a bearing flange 14 on each (Fig. 5). A shoulder 15 on each crank prevents the crank from slipping down through the bearing hole. A pin 16 through the terminal end 12 of each crank, and washers 17 (Fig. 1) prevent the cranks from lifting upwards out of the bearings.

Similar bearings 18 are secured to the under surface of pan 11. The upper ends 19 of the cranks extend through the pan cup bearings 18 as well as through the pan itself. An upper shoulder 20 on each crank prevents the cranks from slipping through the pan bearings, while washers 21 and pins 22 (Fig. 4) prevent the pan from hopping off the cranks while in motion. The pan 11 is supported on the cranks in a plane above and parallel to plate 4.

One of the cranks, preferably the main crank 8 has its lower shaft 23 extended so as to permit its connection with a source of motive power (Fig. 5). The motive power used here is supplied by a motor 24, though it is obvious that a hand crank could also be used. The motor is coupled to the extended crank shaft 23 by a suitable coupling 25. The coupling is of the clutch type, one half of which is secured to the crank shaft 23 and is engaged with the other half which is secured to the motor shaft 26. The motor is secured to the under surface of plate 4 by a flange 27.

The construction related is such that when the motor is energised the main crank is caused to rotate. This action causes pan 11 to move with a rotary motion, going sideways, forward, sideways, backward, sideways, and so on. The upper cranks 7 and lower cranks 9 are so positioned as to rotate in unison with the main drive crank 8. The pan 11 and cranks 7, 9 are located sufficiently in from the edges of plate 4 and the housing interior walls so as to permit rotation of the cranks and movement of the pan without the pan brushing against the walls of the housing.

Fast to the floor of pan 11 are a series of ribs 28 extending, preferably about two inches, above the floor of the pan. The walls 29 of the pan are sufficiently high enough, preferably about four inches, so as to permit the dough rolls to ride the ribs and to roll about the pan without jumping the pan walls. The ribs serve to interfere with the smooth passage of the dough rolls down the inclined pan.

As dough is fed into the pan 11 through the feed opening 2 it is shaken about the pan by the rotary action of the pan and tends to slide and roll down the inclined surface of the pan floor. In doing so, the dough is shaken about and over the ribs 28, whereby separation of the rolls from one another is made certain. There are a series of these ribs spaced in rows, with the ribs of each row in a position alternate to those of the preceding row. The several ribs are spaced a sufficient distance apart from one another to prevent the rolls from becoming jammed between them.

Locating the ribs in this manner further insures the separation of the dough into individual rolls before they reach and roll out the exit opening.

The front or feed opening 2 is provided with a door 30 hinged to the housing 1. This door in opened position, as in Fig. 1, serves as a supply shelf for dough prior to its being fed into pan 11. A chain 31 pivoted to each of the sides of door 30, through a hook 32 at its free end, cooperates with an eye 33 fixed to the housing wall, whereby the door when opened may be latched in a horizontal position. The feed door 30 may be shut and latched in closed position by engagement of one of the chain links with the eye 33 and by insertion of the hook 32 in the eye to secure the chain link thereon.

Secured in an opening across the top of housing 1 by suitable flanges 35 is a duster unit 36 communicating with the interior of the housing. The duster unit is provided with a screen base. A trough plate 37 containing a number of small holes 26 is used here as the screen base. The duster serves to sift flour down upon the rolls being agitated about in the pan below. The duster unit is preferably above the forward end of the pan and a short distance in from the forward edge of the housing top. The dough rolls when dusted with flour separate easier, and when separated will not rejoin together nor will they tend to cling to the pan floor.

The duster operates automatically and in unison with the movement of the pan 11 below. This automatic operation is enabled through linkage of the duster unit with the pan 11. There is shown in the drawing a horizontal rock shaft 38 extending through the duster unit and held in position by washers and pins 71 on each side of the duster housing. Affixed to the shaft are agitators 39. Three of these agitators are used here. They are in the nature of depending U-shaped levers. It is to be noted that the agitators are not aligned in a row, but each is slightly fore or aft the other. The agitators are adjustable, so that their position in relation to the meshed base plate 37 may be raised or lowered. One of the agitators is illustrated in detail in Fig. 7. The agitators are U-shaped with the ends 40 of each arm threaded for engagement with adjusting nuts 41. The agitator arms 42 fit loosely through the duster rock shaft 38. Below the rock shaft on each agitator arm is a pin 43 which supports a washer 44 and a compression spring 45. Another washer 46 is located between the compression spring and the rock shaft. The arrangement is such that tightening of the nuts 41 will draw the agitators upwards away from the trough plate 37, while loosening of the nuts will lower the agitators.

When the cross shaft 38 is rocked the agitators 39 move back and forth. This movement stirs up flour fed into the duster unit and causes it to rain down through the screen base plate 37 onto the rolls moving about in the pan below.

Now to explain the manner by which the agitator rock shaft 38 is caused to rock. The shaft 38 projects a little through the left side of the duster housing as viewed in Fig. 6. Secured at right angles to the rock shaft and in a horizontal position is a short slotted arm 47. Pivoted in the slot 48 by means of a headed stud is a long vertical link 50. The lower end of link 50 is pivoted at 51 to an arm 52 of a crank 53. Crank 53 is pivoted at its apex 54 to a flange 55 affixed to the exterior wall 56 of housing 1. The two armed crank 53 rocks in a slot 57 of housing 1. To the lower arm 58 of crank 53 is pivoted one end of a horizontal link 59. The other end of link 59 is connected by a universal joint 60 to the side of pan 11.

It is plain that when pan 11 is caused to move about, such action will impart a back and forth motion to link 59 causing crank 53 to also rock. This rocking motion will be conveyed from the crank through vertical link 50 and short arm 47 to the rock shaft 38.

Screening means is provided in the floor of pan 11 for permitting the escape of and salvaging for reuse, excess flour not picked up by the rolls. There is shown for this purpose a meshed plate or screen 61 across an opening 62 in the floor of pan 11. This plate is affixed to the pan floor by screws 63. It is obvious that the pan floor itself could be meshed for this purpose, however, it is preferred that a readily removable meshed plate be used to facilitate cleaning of the apparatus. The meshed plate 61 is located a short distance in from the exit end of the pan. Flour and small scraps of dough escaping through the pan screen is caused to drop through the open portion 72 of the supporting plate 4 down into a collecting pan 68 located below in the base of the housing 1.

It is to be noted that the exit end 64 of pan 11 is open without a wall. The lack of a wall at this end of the pan is to allow the rolls a means of exit from the pan.

A chute 65 may be provided to catch the separated rolls as they drop out of the pan 11, and to allow them to roll down onto a conventional work bench or conveyor belt. The chute is supported by flanges 66 adapted to engage in slots 67 of plate 4.

A hinged door 69 may also be provided, so as to keep dirt out of the duster unit 36.

While I have described what I consider to be a highly desirable embodiment of my invention, it is obvious that some changes in form could be made without departing from the spirit of my invention, and I therefore do not limit myself to the exact form herein shown and described and as hereinafter claimed.

I claim:

1. In a roll separating machine a pan supported in an inclined position and having its lower end open said open end serving as an exit for the discharge of roll material from the pan, a plurality of rows of ribs fixed longitudinally to the floor of the pan, the ribs of each row being spaced from one another, and the ribs of each row being spaced from the ribs of the next adjacent row, and the ribs of each row being in a position alternate to the ribs in the next adjacent row, and means for imparting a side to side rotary movement to the pan.

2. In a roll separating machine of the character set forth, a pan, a screen section in the floor of the pan, a plurality of rows of ribs fixed longitudinally to the floor of the pan, the ribs of each row being spaced from one another, and the ribs of each row being spaced from the ribs of the next adjacent row, and the ribs of each row being in a position alternate to the ribs in the next adjacent row, and means for imparting a side to side rotary motion to the pan for the purpose of agitating roll material in the pan about the ribs and over the screen and floor of the pan.

3. In a roll separating machine of the nature set forth including dusting apparatus, the combination of a pan supported in an inclined position and having its lower end open, the pan being adapted to receive therein dough material previously subjected to a roll cutter, a screen portion in the floor of the pan, a plurality of ribs fixed longitudinally to the floor of the pan, the ribs of each row being spaced from one another, and the ribs of each row being spaced from the ribs of the next adjacent row, and the ribs of each row being in a position alternate to the ribs in the next adjacent row, and means for imparting a side to side rotary motion to the pan, and the screen section serving to carry off excess dusting material during such movement dropped from the dusting apparatus into the pan.

4. In a roll separating machine of the character set forth including dusting apparatus, the combination of a rectangular supporting plate fixed in an inclined position, cranks carried in the plate, a rectangular pan surmounted upon the cranks in a plane parallel to the plate, one of the cranks being centrally of the pan, one each of the remaining cranks being in each of the four corners of the pan, said cranks being so constructed and arranged whereby movement of the central crank imparts a side to side rotary movement to the pan, a plurality of ribs fixed longitudinally to the floor of the pan, the ribs of each row being spaced from one another, and the ribs of each row being spaced from the ribs of the next adjacent row, and the ribs of each row being in a position alternate to the ribs in the next adjacent row, the ribs serving to interfere with the smooth passage of dough rolls down the floor of the pan during the movement of the latter, and a screen section in the floor of the pan serving to allow during such motion of the pan the escape of excess dusting material dropped from the dusting apparatus.

FREDERICK HANSALIK.

References Cited in the file of this patent

UNITED STATES PATENTS

| Number | Name | Date |
|---|---|---|
| 29,483 | Halderman | Aug. 7, 1860 |
| 411,960 | Griffith | Oct. 1, 1889 |
| 426,879 | Tafel | Apr. 29, 1890 |
| 577,463 | Stewart | Feb. 23, 1897 |
| 1,065,929 | Ek | July 1, 1913 |
| 1,748,543 | Devlin | Feb. 25, 1930 |
| 1,781,546 | Harber | Nov. 11, 1930 |
| 2,019,818 | Jassoy | Nov. 5, 1935 |
| 2,347,164 | Petrilli | Apr. 18, 1944 |